United States Patent
Dahl

[11] Patent Number: 5,829,786
[45] Date of Patent: Nov. 3, 1998

[54] FIBERGLASS FENDER WITH YIELDABLE MOUNTING MEANS

[76] Inventor: Roger S. Dahl, 610 SW. Coral St., Junction City, Oreg. 97448

[21] Appl. No.: 670,091

[22] Filed: Jun. 25, 1996

[51] Int. Cl.[6] .................................................. B62B 9/14
[52] U.S. Cl. ........................................ 280/848; 296/198
[58] Field of Search ................................... 280/847, 848, 280/850, 153.5; 296/198; 293/1

[56] References Cited

U.S. PATENT DOCUMENTS

| | | | |
|---|---|---|---|
| 4,174,850 | 11/1979 | Hart | 280/153 |
| 4,215,873 | 8/1980 | Price | 280/153 |
| 4,784,430 | 11/1988 | Biermacher | 296/198 |
| 5,139,306 | 8/1992 | Ott et al. | 296/198 |

FOREIGN PATENT DOCUMENTS

| | | | |
|---|---|---|---|
| 0101682 | 5/1941 | Sweden | 280/848 |
| 127414 | 2/1950 | Sweden | 280/848 |

*Primary Examiner*—Peter M. Poon
*Attorney, Agent, or Firm*—James D. Givnan, Jr.

[57] ABSTRACT

A fender is attached to a vehicle side panel by a series of fastener assemblies having a resilient component permitting temporary displacement of the fender from the vehicle side panel. A compression spring biases a fender flange into engagement with the vehicle side panel and permits flange displacement along the fastener assembly as well as angular displacement for accentuated movement of the fender if necessary.

2 Claims, 1 Drawing Sheet

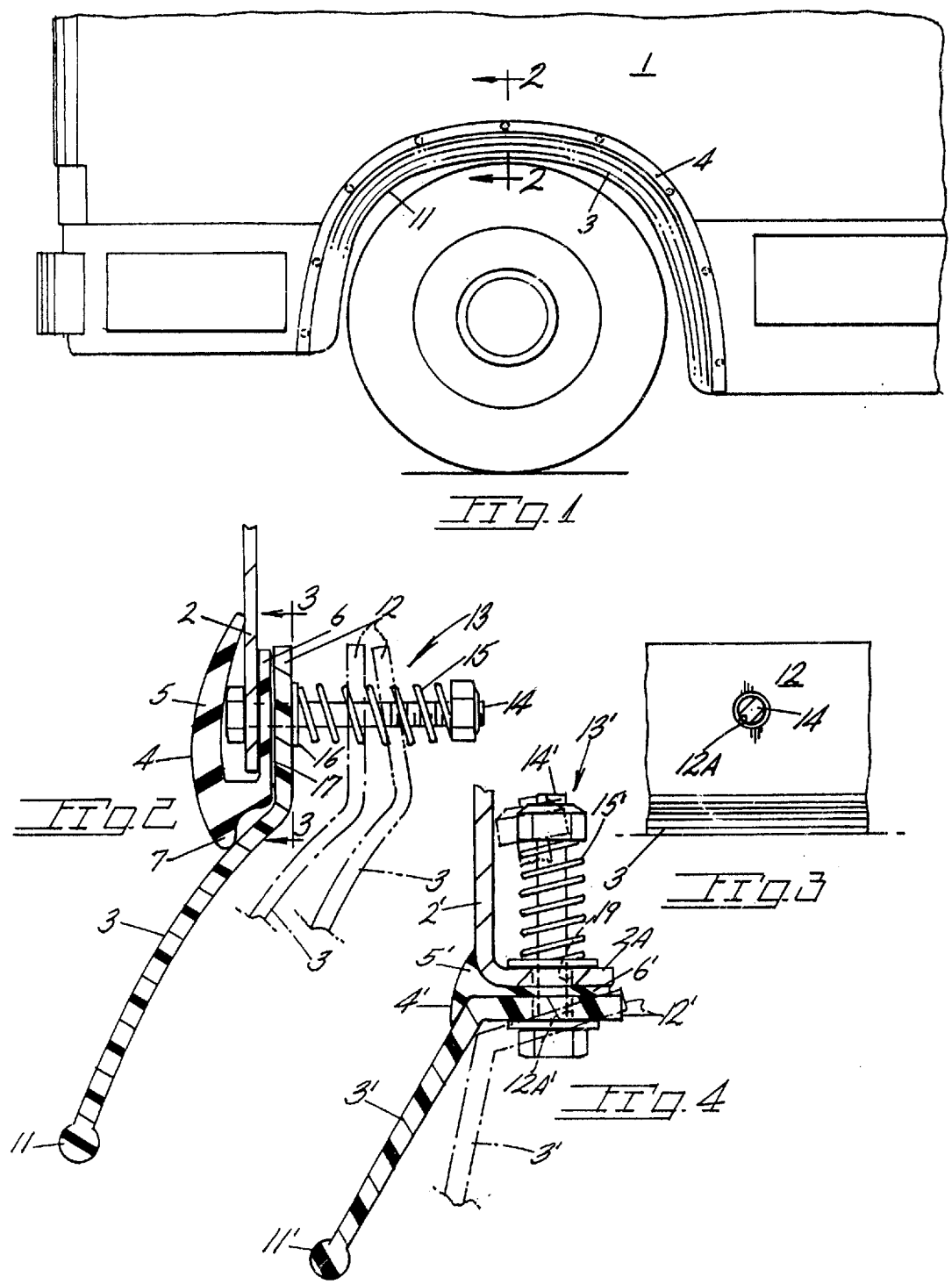

FIBERGLASS FENDER WITH YIELDABLE MOUNTING MEANS

BACKGROUND OF THE INVENTION

The present invention pertains generally to fenders for use on large vehicles such as motor homes and more particularly a fender of semi-rigid construction and means for yieldably mounting the fender to the vehicle.

In wide use today are fenders of elastomeric material fastened into place on a body panel about a vehicle wheel opening. Such fenders are of a resilient nature in that they may yield to a very limited extent upon contact with a stationary abutment.

During any contact of such a fender the fender is subject to abrasion which reduces the overall appearance of the vehicle which, in the case of motor homes, often results in the owner replacing the entire fender. While attempts may be made to resurface a fender of elastomeric material, the fender most often is not returnable to its original attractive appearance. Additionally, the use of fenders of elastomeric material results in such fenders being subject to damage from the sun and over a period of time rendered unsightly. Mounting means for such fenders for vehicles include a series of spaced apart fasteners extending through a body panel, proximate a wheel opening, with the fender secured to the panel in a fixed manner.

U.S. Pat. No. 4,174,850 discloses a fender flare clip having as one of its objects that it permits a fiberglass flare to flex upon accidental engagement with an object. A flexible clip at C includes flexible legs 40 and 42 which "can undergo flexing so as to insure a tight, rattle-proof engagement between the flare 14 and fender 12".

U.S. Pat. No. 4,784,430 utilizes a spring metal clip which is secured to a horizontal flange of a body panel and terminates at its distal end in inserted engagement with the edge of a flare molding of synthetic material to urge same into contact with a body panel.

U.S. Pat. No. 4,215,873 discloses a flexible clip of spring steel, of generally U-shape, for retentive engagement both with a flange on a vehicle side panel and the inner edge of an accessory fender thereto.

SUMMARY OF THE PRESENT INVENTION

The present invention is embodied within a semi-rigid fender attached to the body of a vehicle by yieldable mounting means.

The present mounting means includes fastener assemblies having a yieldable component which may permit momentary displacement of a fender upon contact with an obstruction. A grommet extends about the edge of a vehicle body panel defining a wheel opening. The fender is of a semi-rigid material, such as fiberglass, and yieldably carried by the fastener assembly and moveable therealong in response to contact with an obstruction and in an opposite direction by a resilient component of the fastener assembly. The fender is adapted for movement about two axes to reduce the impact surface of the fender to minimize fender damage and any restoration efforts needed. Fiberglass construction renders the fender conveniently repairable with minimal effort, and more importantly, permits the fender to have an appearance contributing to the overall vehicle as opposed to earlier fenders of rubber construction.

Important objectives of the present fender and mounting means include the provision of a fender for use in large vehicles such as motor homes which are yieldable to avoid damage from contact with a stationary object; the provision of a fender and mounting means including a fender of semi-rigid synthetic material which may move upon contact with an obstruction about multiple axes to minimize damage and which is automatically restored to its position by resilient fastener means; the provision of a fender and mounting means which adds to the vehicle appearance in distinction to prior art fender and mounting means; the provision of a fender for a recreational vehicle which withstands the damaging affects of sun to avoid an unsightly appearance after prolonged exposure.

BRIEF DESCRIPTION OF THE DRAWINGS

In the accompanying drawings:

FIG. 1 is an elevational view of a vehicle body with the present fender mounted in place about a wheel opening;

FIG. 2 is a vertical sectional view taken along line 2—2 of FIG. 1;

FIG. 3 is a vertical sectional view taken along line 3—3 of FIG. 2;

FIG. 4 is a view similar to FIG. 2 but showing a second form of the invention.

DETAILED DESCRIPTION OF THE PREFERRED EMBODIMENTS

With continuing attention to the drawings wherein applied reference numerals indicate parts similarly hereinafter identified, the reference numeral 1 indicates the side of the body of a bus, recreational vehicle or motor home.

The reference numeral 2 indicates a marginal portion or panel of the body defining a wheel well opening which varies in size and configuration depending on the vehicle and whether it is a front wheel or rear wheel opening. Typically in large motor homes and buses, the body side has little or no protrusions other than exterior rear view mirrors.

The present fender is indicated at 3 and will be of various sizes and shapes to best suit the particular wheel well opening to which it is applied. A grommet at 4 is installed about portion 2 of the body defining the wheel well opening and includes external and internal flanges 5 and 6 and a depending nose 7. Such grommets are presently in use on the class of vehicles above noted.

With attention to the present fender and mounting means, fender 3 is of moulded fiberglass construction and terminates at its distal edge 11 in a bead. The fender includes a mounting flange 12 along its 20 outer extremity and which is isolated from contact with body 1 by internal grommet flange 6. With reference to FIG. 3, it will be seen that flange 12 of the fender defines a spaced apart series of openings as at 12A for reception of a fastener assembly generally at 13 having a bolt 14. Thus upon contact of fender 3 with an obstruction the fender may yield with mounting flange 12 being displaced along fastener assembly 13 as well as canted out of its normal relationship with the fastener assembly to contribute to avoidance of damage to the fender by the obstruction. Resilient means at 15 of the fastener assembly is shown as a compression spring acting on a washer 16 and fender flange 12 to at all times urge the fender flange toward abutment with grommet 4. In effect, oversize opening 12A permits rocking displacement of fender flange 12.

Upon contact of a fender with an obstruction a portion or all of the fender may be displaced. With the fender constructed from fiberglass of a thickness of approximately 3/16 of an inch the fender may distort and/or flex in addition to being displaced inwardly. If desired another resilient means may be utilized in place of spring 15, as for example, a leaf spring in place on bolt 14 or a block of resilient cellular material. An adhesive sealant at 17 is applied along fender flange 12 to prevent seepage downwardly along fender 3.

A modified form of the invention is shown in FIG. 4 wherein prime reference numerals indicate parts corresponding to parts of the first described form of the invention identified by like base reference numerals. A modified fender 3' has a flange 12' with an oversize aperture 12A' through which passes a fastener assembly 13'. A vehicle body flange at 2A partially defines a vehicle wheel well and is apertured at 19 in an oversize manner for reception of fastener assembly 13'. A rubber grommet is at 4' and has external and internal flanges at 5' and 6'. Upon fender 3' contacting an obstruction, the fender flange 12' may rock about its innermost edge to the broken line position shown. Return of the fender occurs automatically by the action of the spring 15' acting on the head of the fastener assembly. This modified form of the invention is to provide a yieldable fiberglass fender for those vehicles wherein a wheel well is partially defined by a body panel terminating in an inwardly directed flange.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. In combination with a vehicle body panel partially defining a wheel well and having a series of openings, a grommet in place on said panel and having an internal flange in abutment with said panel, a fender having a mounting flange in abutment with said internal flange of the grommet, a fastener assembly including a shaft extending through said panel, said internal flange of the grommet and said mounting flange of the fender, resilient means in place on said shaft and urging said mounting flange toward said vehicle body panel, said resilient means permitting momentary displacement of the mounting flange and fender upon contact of the fender with an obstruction with said resilient means thereafter restoring the mounting flange into position against said internal flange of the grommet.

2. The combination claimed in claim 1 wherein said mounting flange of the fender defines an aperture of a size to loosely receive said shaft of the fastener assembly to permit angular displacement of the mounting flange during contact of the fender with the obstruction.

* * * * *